May 21, 1929.  H. RAMSDEN  1,714,046
LUBRICATING MEANS
Filed Sept. 30, 1924  7 Sheets-Sheet 1
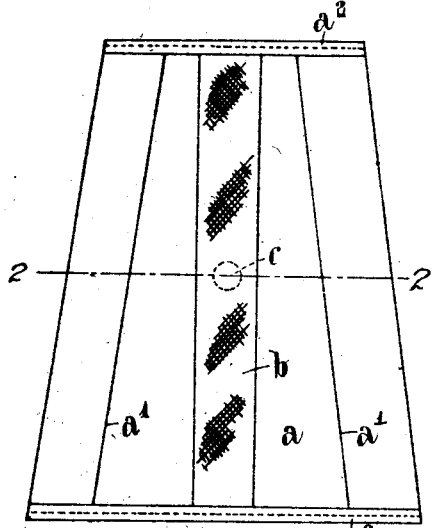
Fig.1.
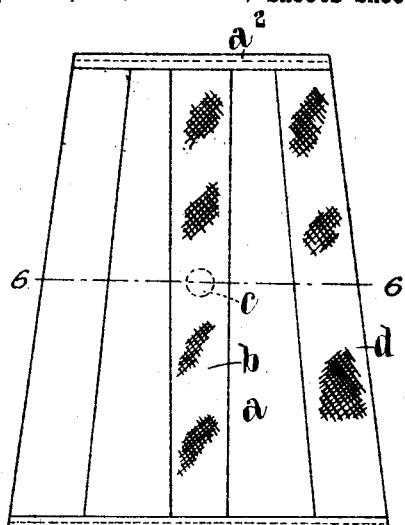
Fig.5.
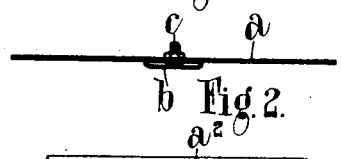
Fig.2.
Fig.6.
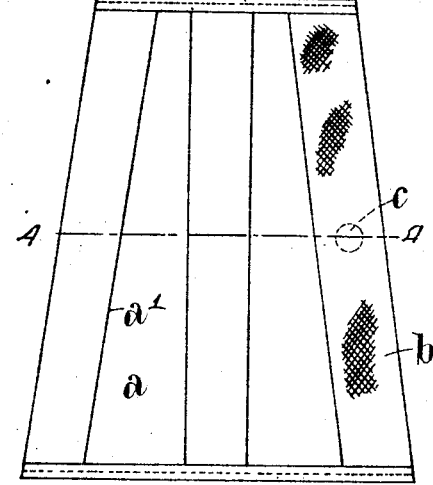
Fig.3.
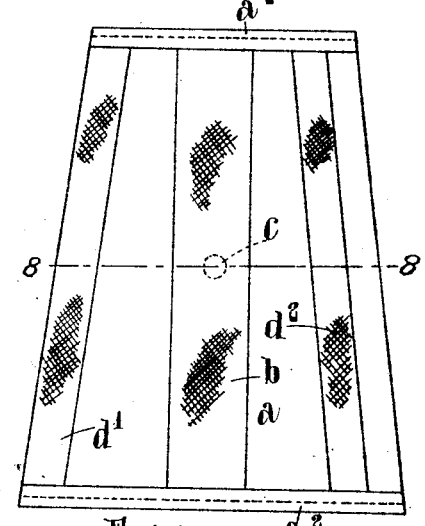
Fig.7.
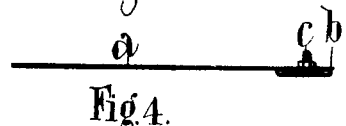
Fig.4.
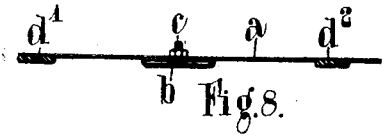
Fig.8.
Inventor
H. Ramsden
By Marker Clark
Attys.

May 21, 1929.  H. RAMSDEN  1,714,046
LUBRICATING MEANS
Filed Sept. 30, 1924  7 Sheets-Sheet 2
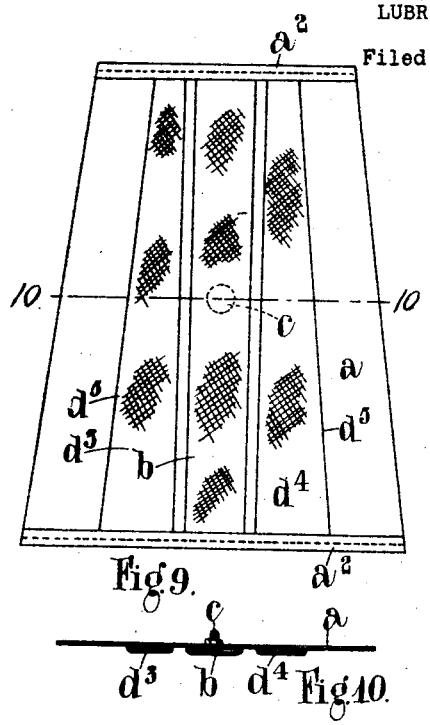
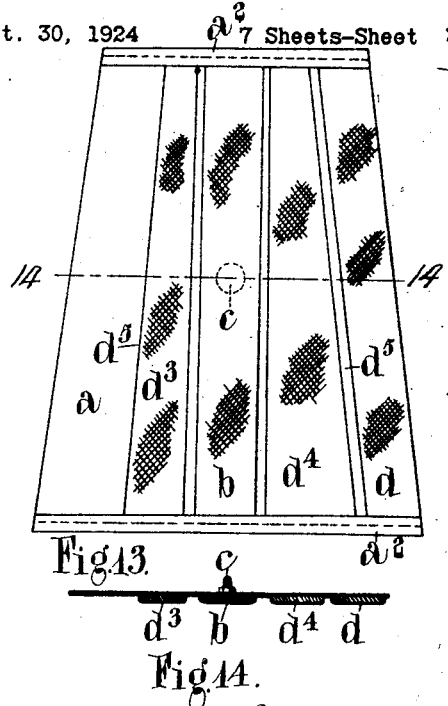
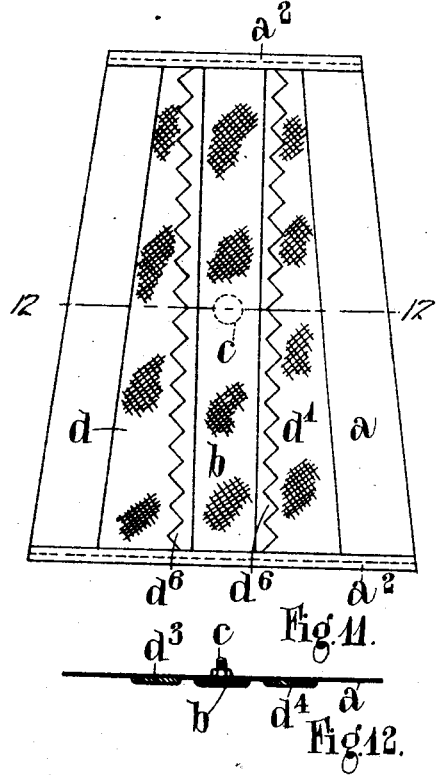

May 21, 1929.  H. RAMSDEN  1,714,046
LUBRICATING MEANS
Filed Sept. 30, 1924  7 Sheets-Sheet 3
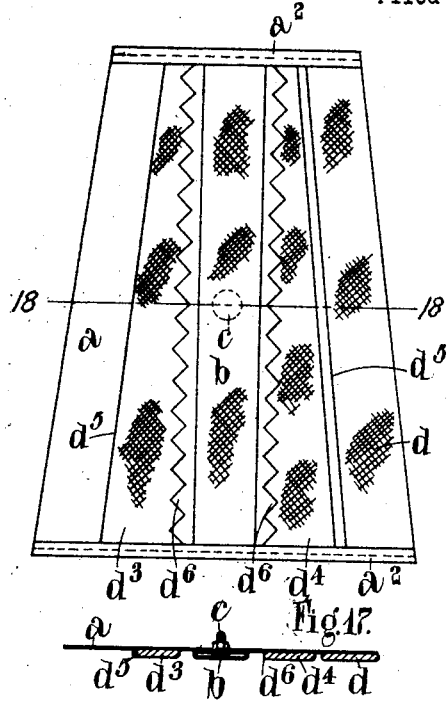
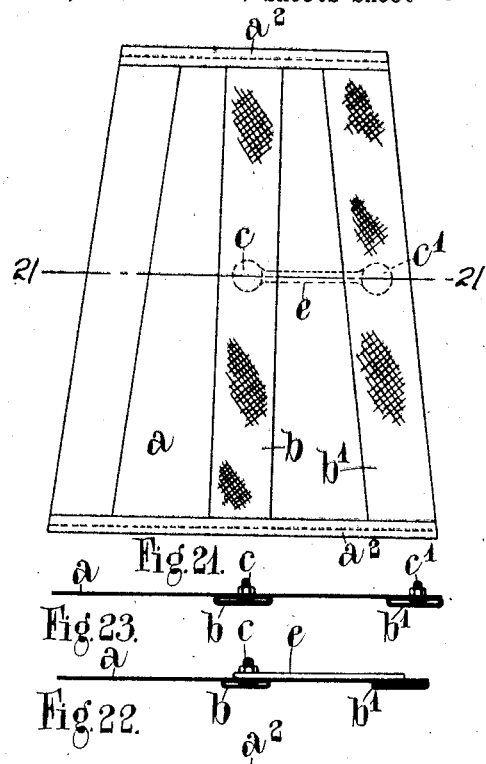
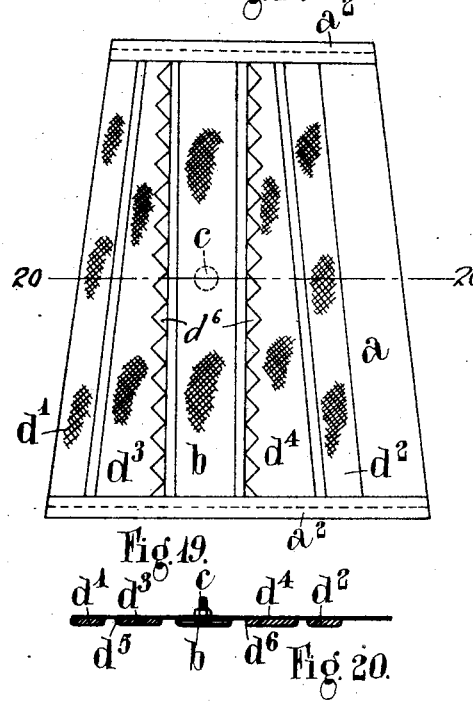
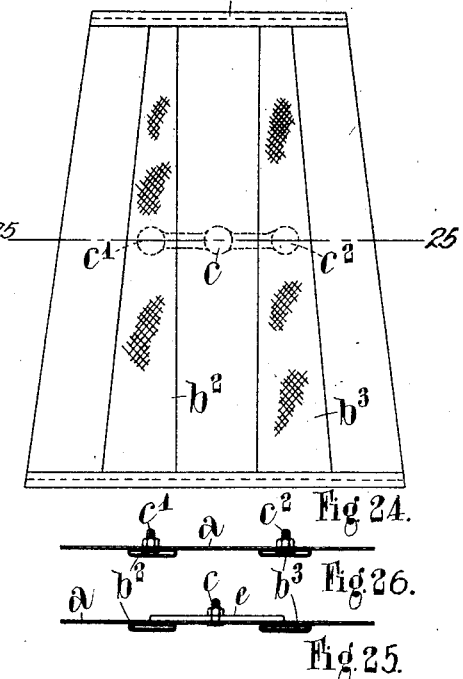
Inventor
H. Ramsden May 21, 1929. H. RAMSDEN 1,714,046
LUBRICATING MEANS
Filed Sept. 30, 1924 7 Sheets-Sheet 4
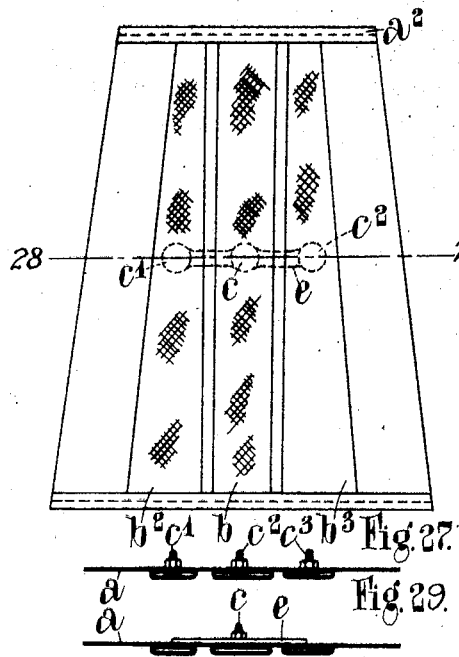
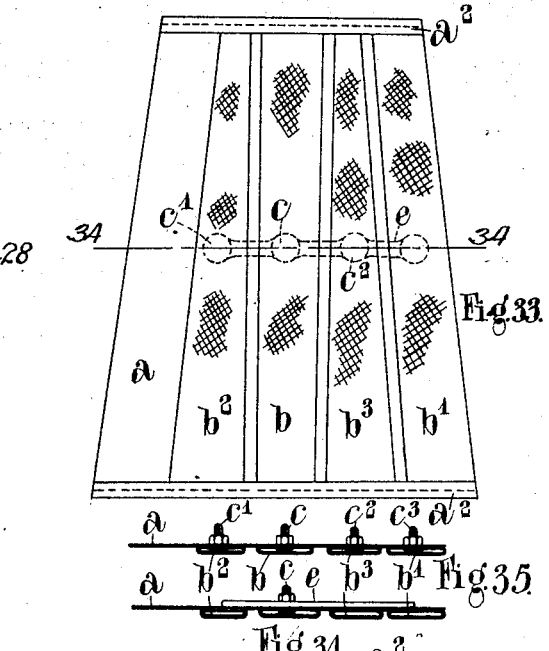
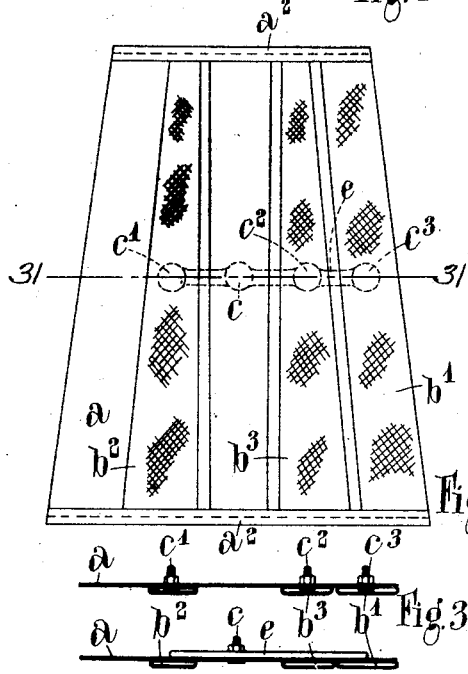
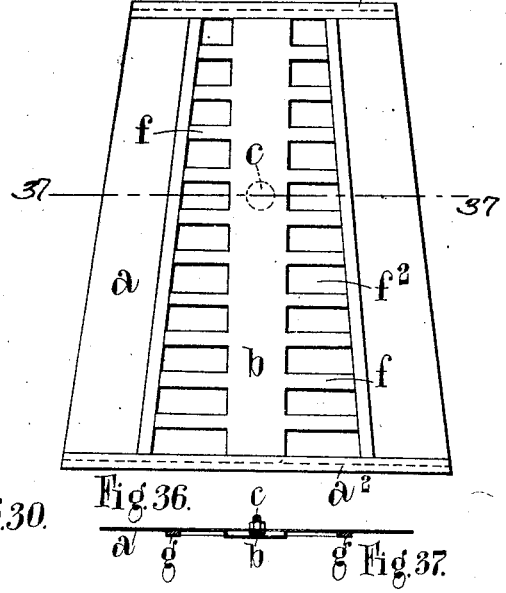

May 21, 1929.  H. RAMSDEN  1,714,046
LUBRICATING MEANS
Filed Sept. 30, 1924  7 Sheets-Sheet 5
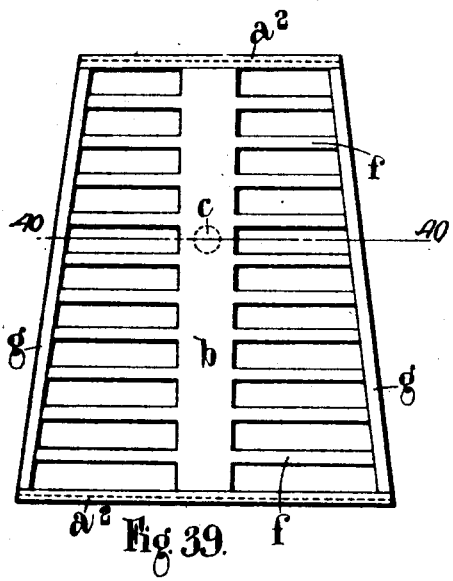
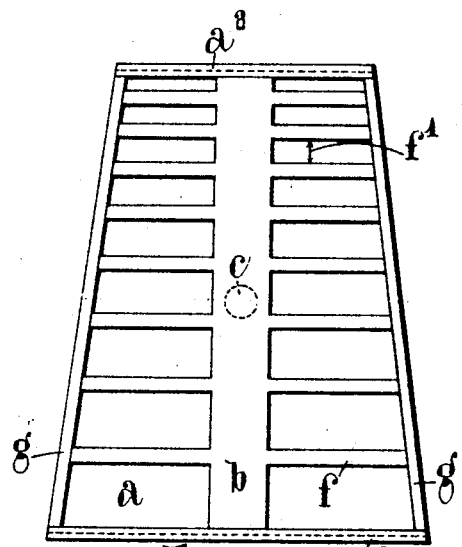
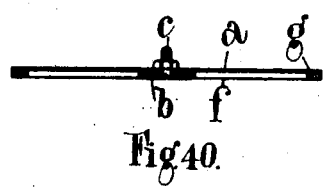
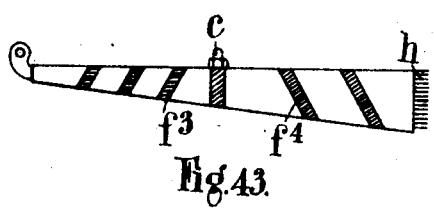
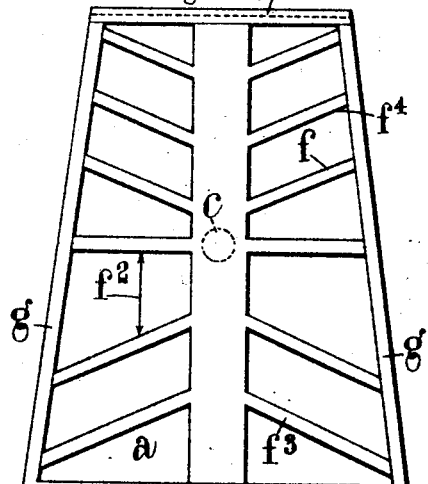

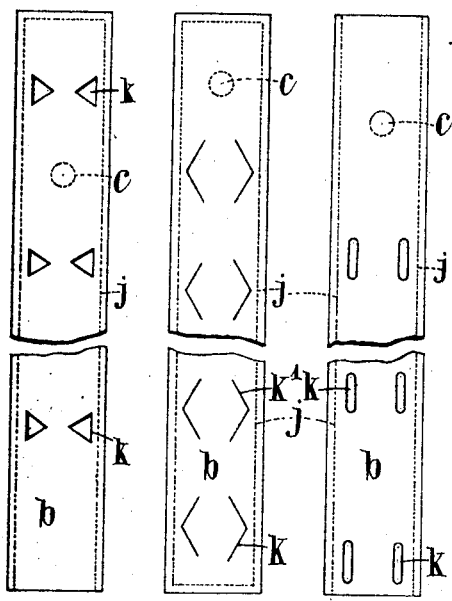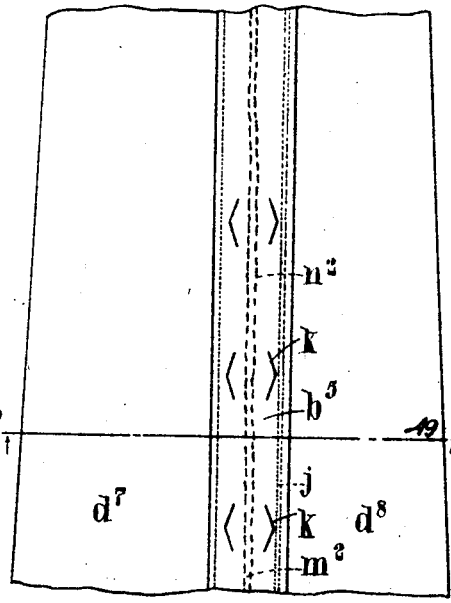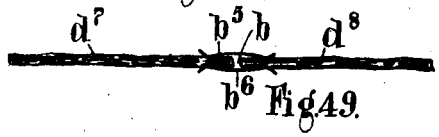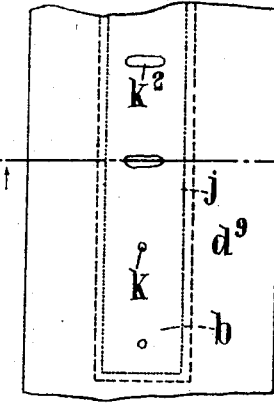

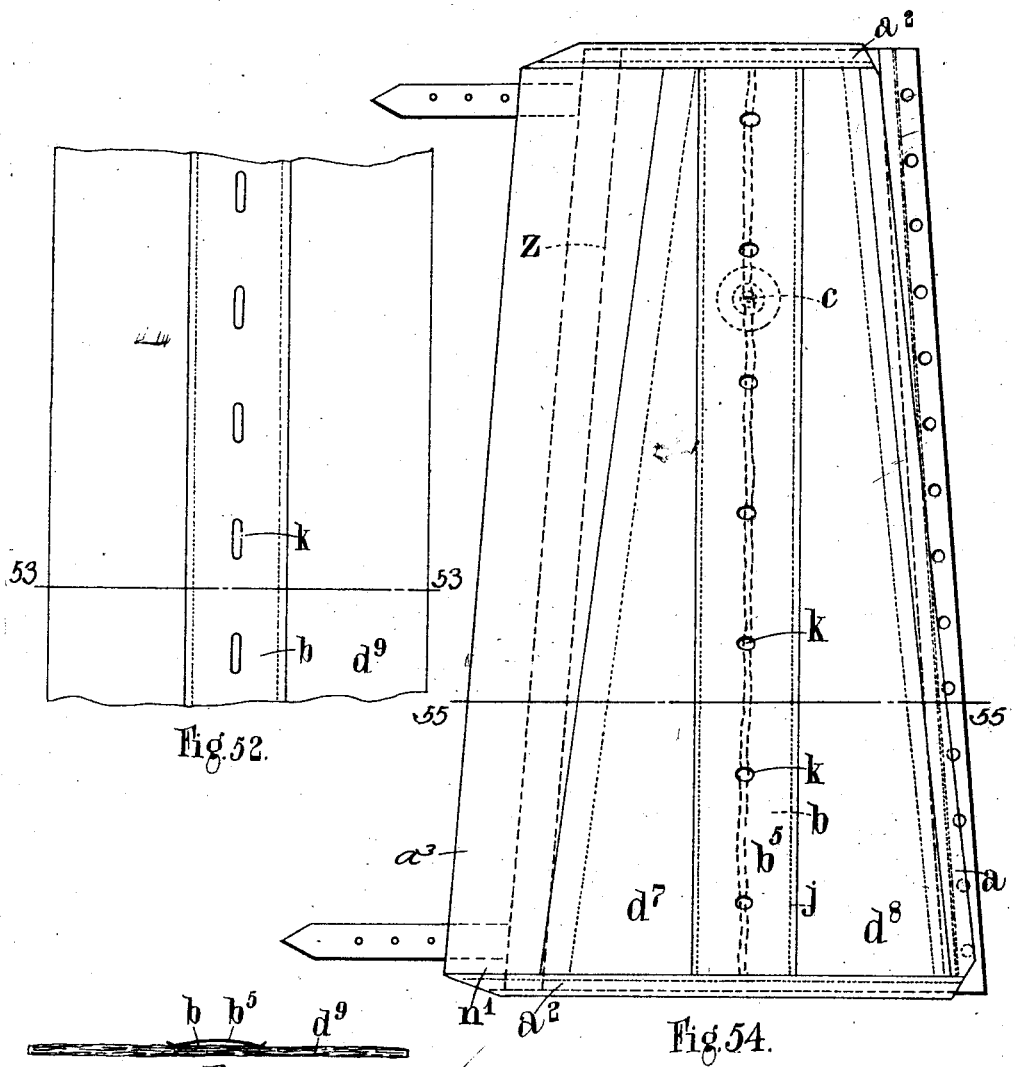

Patented May 21, 1929.

1,714,046

UNITED STATES PATENT OFFICE.

HENRY RAMSDEN, OF LIGHTCLIFFE, ENGLAND.

LUBRICATING MEANS.

Application filed September 30, 1924, Serial No. 740,809, and in Great Britain October 17, 1923.

This invention relates to means for lubricating vehicle and like springs and has particular reference to gaiters or covers of the type commonly used in connection with motor car springs of the multiple leaf or laminated type.

The invention has for its object the provision of improved means whereby a lubricant may be readily introduced into the gaiter or cover and distributed therein so that the enclosed spring may at all times be thoroughly and effectively lubricated.

A further object of the invention is to provide for a reserve or supply of lubricant to be retained in association with the spring and gradually discharged or disseminated over the spring surfaces or throughout a gaiter enclosing a spring.

A further advantage of the invention lies in the direction or delivery of the lubricant so that it may travel in the clearances within a gaiter or between a layer (or layers) of material and the spring surfaces, in contradistinction from gradually creeping or travelling through a felt or wick.

The invention consists in a collapsible conduit adapted to receive a supply of lubricant and cause its distribution over spring surfaces uniformly. The adaptation of the collapsible conduit for distribution purposes may involve the use or employment of apertures or valvular openings in the conduit or the conduit may be adapted for the purpose by providing it with a porous wall (or walls) such that a charge or supply of lubricant is temporarily retained and gradually delivered through the walls or material of the reservoir or conduit.

In the accompanying drawings:—

Figure 1 is an inside plan view of lubricating means as applicable to a gaiter according to the invention.

Figure 2 is a cross section on the lines A—A of Figure 1.

Figures 3, 5, 7, 9, 11, 13, 15, 17 and 19 are inside plan views of modifications of the invention, and Figures 4, 6, 8, 10, 12, 14, 16, 18 and 20 are respectively cross-sectional views taken on the lines A—A of Figures 3, 5, 7, 9, 11, 13, 15, 17 and 19.

Figure 21 is an inside plan view of another form of the invention wherein two connected conduits are employed.

Figure 22 is a cross-section on the lines A—A of Figure 21 and shows the connected conduits with a single inlet valve.

Figure 23 is a cross-section of a modification of the arrangement illustrated in Figure 21, wherein separate conduits and separate valves are provided.

Figure 24 is an inside plan view showing a modified form or construction of a pair of conduits according to the invention.

Figures 25 and 26 are respectively a cross-sectional view taken on the lines A—A, Figure 24, showing connected valve inlets and a corresponding cross-section of a modified arrangement showing separate valve inlets.

Figures 27 and 30 are inside plan views showing a modification of the invention in which three conduits or reservoirs are employed.

Figures 28 and 31 are respectively cross-sections on the lines A—A of Figures 27 and 30 showing connected valve inlets.

Figures 29 and 32 being sectional views showing alternative arrangements of the construction (separate valve inlets) illustrated in Figures 27 and 30.

Figure 33 is an inside plan view of a modification of the invention illustrating the employment of four conduits or reservoirs, while Figure 34 is a section on the line A—A, Figure 33, (connected valve inlets) and Figure 35 is a similar section of an alternative arrangement showing separate valve inlets.

Figures 36, 39 and 41 are inside plan views illustrating modifications of the invention in which a conduit having branches or lateral ducts is provided.

Figures 37 and 40 are respectively cross-sectional views taken on the lines A—A of Figures 36 and 39.

Figure 38 is a diagrammatic side elevation illustrating the application of the lubricating means shown in Figure 36 to a vehicle spring.

Figure 42 is an inside plan view showing lubricating means of the main and branch conduit type wherein the branches or lateral ducts are arranged in divergent fashion.

Figure 43 is a diagrammatic side elevation showing lubricating means as seen in Figure 42 applied to a vehicle spring.

Figures 44, 45 and 46 are plan views of flat tubular bodies suitable for use as conduits according to the invention and exemplifying several forms of valvular openings.

Figure 47 is a side view of a valve partly in section suitable for use according to the invention showing it mounted upon a conduit such as is depicted in Figure 44, 45 or 46 in cross-section.

Figure 48 is an underneath plan of a conduit of greaseproof material combined with wick material.

Figure 49 is a cross-section of Figure 48 on the line A—A.

Figure 50 is an underneath plan of a conduit comprising a greaseproof material and a wick material and illustrating two forms of valvular opening cut in the wick material.

Figure 51 is a cross-section of Figure 50 on the line B—B.

Figure 52 is an underneath plan of a conduit comprising a greaseproof material and a wick material showing another arrangement of valvular opening formed in the greaseproof material.

Figure 53 is a cross-section on the line C—C of Figure 52.

Figure 54 is an inside or underneath plan of a gaiter illustrating a conduit of greaseproof material combined with wick material and in which the greaseproof material is extended to form a lining for the gaiter.

Figure 55 is a cross-section on the line D—D of Figure 54.

In carrying the invention into effect as applied, by way of example, to a gaiter of known construction consisting of a leather jacket adapted to be wrapped round a vehicle spring, and having the overlapping edges secured or fastened together by appropriate means, a piece of waterproof material or fabric, such as $a$, is cut to a shape adapted to correspond with that of the gaiter. This piece of fabric may be of a size such as will afford overlapping side margins when the gaiter is in position upon a spring. The lines $a'$ indicate the lines on which the lining and gaiter are bent round the under corner edges of the spring.

A tubular piece of fabric, such as tubular wicking, is positioned between the fabric $a$ and the spring and is adapted to extend from end to end of the lining $a$. This tubular member $b$ may be cut from continuous tubular lengths made up of one or more pieces. This tubular member is adapted to constitute the conduit or reservoir according to the invention and is preferably of a form such that when in position and when empty it lies in a flat or collapsed form against the fabric $a$. The tube is mounted upon the lining $a$ and its ends are closed preferably by turning the end margins $a^2$ of the fabric $a$ inwardly and stitching them down upon the extremities of the tube $b$. A valve is provided upon the gaiter through which the lubricant may be forced into the tube $b$. This valve is indicated at $c$ and is mounted in such a fashion that it communicates with the interior of the tube $b$ and while the valve is indicated in a central position it may, if desired, be located towards either end of the tube or elsewhere.

A tubular conduit and suitable mounting therefor as above described is illustrated in Figures 1 to 20.

The tube may be positioned more or less centrally of its lining or gaiter (see Figures 1 and 2 and 5 to 20) in which case it is adapted to lie upon the top of the spring or possibly along the bottom of the spring when the gaiter is laced or secured upon the upper surface of the spring, or, if desired, instead of locating the tubular element centrally of the gaiter or the fabric, it may be located at or adjacent one side margin or to one side of the centre as indicated at $b$ in Figures 3 and 4. In this case the position of the valve $c$ would be correspondingly changed and the tube would be normally adapted to fit the bottom of the spring. It is preferred that the width of the conduit or tube in the collapsed form should more or less correspond with the width of the top or bottom of the spring to which the gaiter is applied.

The tubular conduit according to the invention may be combined with fabric, such as woven wick or other material which is adapted to absorb some of the lubricant which escapes from the conduit. This saturated pad is in constant contact with the spring and serves as an additional means of lubrication after the lubricant has been distributed throughout the entire length of the spring by means of the conduit. The conduit may be combined with absorbent material in a variety of ways. For example, a strip of wicking fabric $d$ may be disposed along one side margin of the waterproof fabric $a$ (see Figures 5 and 6). This piece of wicking $d$ may lie along the margin of the fabric and be secured at each end in the same manner as the conduit $b$ is secured. When the lining $a$ is applied to the spring the wick element $d$ will fit the bottom of the spring.

Alternatively, the strip of wick (such as $d$) may be located centrally and the tube $b$ may be located in a position occupied by $d$ as shown in Figures 5 and 6. This alternative form lends itself to the application of the tube or conduit part to the bottom of the spring when the pad or wick material $d$ would lie along the top of the spring.

As another example of the combination of an absorbent wick or pad with a conduit, a conduit $b$ may be arranged centrally and two narrow wick portions $d'$ and $d^2$ may be situated at either side thereof (see Figures 7 and 8). The wick $d'$ may be located upon the left-hand margin and the wick $d^2$ may be located spaced a short distance from the right-hand side edge of the fabric $a$. The conduit $b$ is adapted to be applied to the top of the spring and the left- and right-hand wick pads $d'$ and $d^2$ are adapted to lie together underneath the spring when the fabric $a$ is wrapped round such, so that in effect the pads $d'$ and $d^2$ together virtually form a single pad of approximately the same width as the spring. The edge of the fabric may form an overlap or seal the lining.

The auxiliary wick or pad material may be in a form having parallel edges (see Figures 5 and 7, for example) when such as adapted to lie at the top or bottom of the spring or such may be tapered in conformity with the taper or shape of the spring when the pads are to be disposed laterally of the spring. For example, in Figures 9 and 10 views are shown of left- and right-hand pads $d^3$ and $d^4$ arranged upon either side of a central parallel conduit. The margin of the pads $d^3$ and $d^4$ which lie next the tube may be disposed parallel to the latter while the outer edges $d^5$ taper inwardly towards the axis of the tube. The pads $d^3$ and $d^4$ are thus adapted to fit the sides of a vehicle spring and by making them of taper form, they may be adjusted to be substantially coextensive with the lateral portions of the spring.

Instead of making the edges of the pads $d^3$ and $d^4$ which lie towards the conduit on a straight parallel line, such may be given a wavy, serrated or zig-zag formation by cutting out pieces or by having the fabric woven in this fashion so as slightly to retard the flow of lubricant and enable such to be absorbed more readily by the pads.

Figure 11 at $d^6$ illustrates the above modified shape of inner edge of the pads $d^3$ and $d^4$.

According to a modification of the invention a conduit may be combined with three or more strips or parts of absorbent material or wick.

In one form (Figures 13 and 14) a single tubular conduit $b$ may be disposed centrally of the gaiter and has upon each side thereof strips of wicking $d^3$ and $d^4$ arranged and shaped after the fashion shown in Figure 9, so that such are adapted to lie against the sides of the spring of the vehicle. A third pad $d$ may be arranged against one marginal edge of the gaiter or fabric strip $a$ so that such will lie along the bottom of the spring when the gaiter is wrapped or folded in position.

The strips $d^3$ and $d^4$ of Figure 9 may, if desired, be provided with serrated edges $d^6$ (see Figure 17) in the manner already described in connection with Figures 11 and 12.

According to another alternative the arrangement shown in Figures 7 and 8 may be combined with the arrangement shown in Figures 9 and 10 in which case four strips or pieces of wicking $d'$, $d^2$, $d^3$ and $d^4$ are provided, two ($d^3$ and $d^4$) being located upon each side of the conduit $b$ while the other two ($d'$ and $d^2$) are fixed to the sides of the lining $a$.

This combination is indicated in Figures 15 and 16 while in Figures 19 and 20 the same arrangement is shown with a modification according to the edge formation illustrated in Figure 11 consisting in providing the wicks or pads $d^3$ and $d^4$ located nearest the central conduit with serrated or wavy edges $d^6$.

In operation when a conduit as described above or as referred to hereinafter receives a charge or supply of lubricant under pressure from an oil gun, it is caused to swell up or expand to accommodate the charge and by reason of the nature of the walls the conduit holds the lubricant and acts as a reservoir or source of supply internally of the gaiter. The expansion of the conduit within the confines of the gaiter and the reactive effect of the latter maintain or impose a pressure upon the lubricant so that it is caused slowly and gradually to exude through the pores or interstices of the fabric and come into contact with the spring surfaces or lie available for lubrication purposes in the clearances or pads within the gaiter. The pressure effect upon the lubricant may be augmented or sustained by the aid of mechanical means such as a comparatively light leaf spring disposed over the conduit.

Thus it will be understood that a constant supply of oil or lubricant is available for an extended period and that the application of lubricant to the spring is carried on continuously while the store remains unexhausted at a rate appropriate to the spring's capacity to use or absorb the lubricant between its leaves.

In carrying the invention into effect according to another mode, as illustrated in Figures 21 to 35, a plurality of conduits or reservoirs may be provided, each of which may have a separate charging or filling valve or a charging or filling valve may be provided which supplies lubricant to two or more conduits by the aid of an intermediate passage or connection. These conduits may be spaced apart from one another so that clearances or longitudinal cells are provided in which the lubricant may collect as discharged from the conduits and lie in direct contact with the spring surface.

Absorbent material or pads of wicking may be employed in combination with the plurality of conduits and located in appropriate situations.

According to Figure 21 a pair of conduits $b$ and $b'$ are mounted upon a lining $a$. The conduit $b$ may be located centrally so as to fit the top of the spring while the conduit $b'$ is positioned at the margin of the lining so that when the lining is wrapped around the spring the second conduit lies along the bottom of the spring.

A charging valve $c$ (see Figure 23) may be provided in association with the conduit $b$ and a passageway $e$ may extend from the position of the filling valve $c$ to the conduit $b'$ so that oil may pass from the filling valve or conduit $b$ to the conduit $b'$. This passageway or connection and the passageways or connections referred to hereinafter in connection with Figures 24, 27, 30 and 33 may be made of any suitable material. For example, a duct may be constituted by a tube of grease proof fabric or these connections may be made in metal if desired. Instead of providing a valve $c$ common to both conduits, the conduit $b$ may be provided with a valve $c$ and the conduit $b'$ may be provided with an independent valve $c'$ (see Figure 23).

In Figure 24 a pair of conduits are provided in a situation so that when the lining $a$ is wrapped round the spring the conduits $b^2$ and $b^3$ lie at the sides of the spring. These conduits are preferably tapered to conform to the shape of the spring to which they are applied. The valve $c$ common to both conduits (see Figure 25) may be provided and placed in communication with each conduit by a passageway or connection $e$. Alternatively, a separate valve $c'$ and $c^2$ (see Figure 26) may be employed for each conduit.

According to Figures 27 and 30 three conduits are utilized. In Figure 27 the conduit $b$ is located centrally and has a conduit $b^2$ and $b^3$ on each side thereof. In Figure 30 a conduit $b'$ is located on the right-hand margin of the lining so that it fits the bottom of the spring and two conduits $b^2$ and $b^3$ are positioned for the sides of the spring. In both figures the conduits $b^2$ and $b^3$ are tapered to correspond with the shape of the spring. A common filling valve $c$ may be provided upon or in communication with a passageway $e$ which connects with each of the three conduits (see Figures 28 and 31), or separate valves $c'$, $c^2$ and $c^3$ may be provided for each conduit (see Figures 29 and 32).

As a modification a conduit may be mounted for the top, the bottom and each side of the spring. Such a form of lubricating means is illustrated in Figure 33. The conduit $b$ is arranged centrally upon a lining $a$ and has a tapered conduit $b^2$ and $b^3$ located on each side thereof, while at the right-hand margin of the lining a fourth conduit $b'$ is provided for the bottom of the spring.

A common filling valve $c$ may be mounted on the conduits $b$ and adapted to communicate by passage $e$ with the conduits $b^2$, $b^3$ and $b'$ (see Figure 34) or a separate filling valve $c$, $c'$, $c^2$ and $c^3$ may be situated on each of the conduits $b$, $b^2$, $b^3$ and $b'$ (see Figure 35).

In each of the Figures 21, 24, 27 and 30, the position of the filling or charging valves has been indicated in dotted lines in addition to the indication feature of the passageway or connection $e$, although, of course, it will be understood that the independent valves and the passageways are not used together.

In carrying the invention into effect according to another modification, a lining $a$ has mounted upon it a main or central conduit $b$ (see Figures 36, 39, 41 and 42). On each side of this main conduit a plurality of spaced branches or lateral ducts $f$ are jointed. These ducts may be of flat tubular form and are adapted to convey the lubricant away from the main conduit. It is preferred that these conduits should be made of tubular woven webbing or canvas material such as is employed for the main conduit in order that the lubricant may gradually be exuded through the pores or interstices of the fabric as it is or when it has been conveyed throughout the gaiter.

The ducts or branches are spaced apart a suitable distance and arranged so that cells or clearances $f^2$ exist between the conduits. These cells are adapted to collect or become filled with lubricant as delivered from the main conduit and branches so that free lubricant lies in direct contact with the spring surfaces. The branches or lateral ducts may be equally spaced longitudinally of the main conduit or such may be placed close together towards the free end of the spring, for example as shown at $f'$ in Figure 41.

The branches may extend at right angles to the conduit or they may be arranged obliquely thereto. For example, according to Figure 42, a branch or lateral duct extends on each side of the conduit at right angles thereto in the region of the filling valve, shown dotted at $c$. The conduits $f^3$ and $f^4$ are arranged obliquely to the main conduit and at an angle to the duct $f$ and diverge away from the latter as they approach the margins of the lining $a$.

The lateral ducts $f$, $f^3$ or $f^4$ may be closed at their end and terminate at this point or they may communicate with supplementary longitudinal conduits in the position $g$ (see Figures 36, 39, 41 and 42) or they may abut against or terminate at strips or longitudinal pieces of absorbent material or wick $g$ which is adapted to become soaked with the lubricant.

The provision of pads or longitudinal strips in a position such as shown at $g$, assists in the formation of enclosed cells or pockets, as indicated at $f^2$, for the collection of free lubricant.

The lateral branches may extend partly across the width of the lining (see Figure 36) so that when the lining is folded round the springs the conduits lie across or partly across the sides of the spring $h$ (see Figure 38). Alternatively, the conduits may extend practically the full width of the lining (see Figures 39, 41 and 42).

In Figure 43 the arrangement shown in

Figure 42 is illustrated as applied to a spring $h$, the ducts $f^3$ and $f^4$ lying against the sides of the spring and extending to the under side thereof.

In the various ways of carrying the invention into effect and the modifications of the invention, if desired the turned over end margins $a^2$, which are adapted to hold the conduit or conduits in position, may also serve as ducts for conveying the lubricant from one conduit to another and thus assist in the distribution of lubricant or such may constitute the sole means of communication between the conduits.

When such a construction is adopted the conduits are secured to the turned over portions of the lining in such a way that the lubricant has free access to the interior of the turned over portion.

It will be appreciated that in the foregoing description the conduits have been described as mounted upon a lining and secured thereto at each end thereof. This construction possesses the advantage that conduits or pads of absorbent material secured in this way do not obstruct the flow or passage of lubricant between such and the lining or between such and the spring but it is to be understood that the invention is not confined in this respect and that the conduits may be mounted in any suitable manner and combined in any appropriate way with any known form of gaiter, lining or lubricant-distributing means.

In carrying the invention into effect when it is intended to make the conduit or reservoir of grease-proof material or partly of grease-proof material a conduit is provided of grease-proof fabric or rubber formed as a flat tube. This tube may be manufactured in any preferred manner, for example, it may be moulded or the fabric may be integrally woven in the shape of a tube or one or more pieces of fabric may be joined together by stitching along the edges. Both ends of the tube are preferably closed and a one-way charging valve of any known appropriate type is mounted upon the conduit so that the lubricant forced through the valve is delivered into the interior of the tube.

The tube is preferably of a length such that it will extend from one end to the other of the spring or part of the spring to which the gaiter is applied. The width of the conduit may be determined by the width of the spring and the tube when in its flattened condition may be substantially the same width as the spring to effect more direct distribution to the edges of the spring leaves, or the width of the conduit may be such as to extend along the sides of the spring as referred to (for example) hereinafter.

When applied to laminated springs of the semi-elliptical type (where the longest leaf is uppermost), the tube may be adapted to be located on and to lie along the uppermost leaf of the spring and the flat side of the tube contacting with the leaf surface is formed with valves or valvular openings. When applied to laminated springs of the cantilever type (where the shortest leaf is uppermost) the tube is applied to the upper surface of the spring and being flexible conforms to the shape of each leaf and allows the outer cover of the gaiter similarly to follow the contour of the leaves.

The valves are preferably formed by cutting the material of the conduit or tube through so as to provide lips of open V-shape. A series of such valves may be formed in spaced relationship throughout the length of the conduit. A suitable arrangement consists in forming the V-shaped valves opposite one another towards each margin of the flattened tube, the points of the V-shaped lips being disposed outwardly.

According to another form the valves may be formed by cutting out V-shaped notches in the edges of the material of the tube or removing triangular shaped pieces of the material. In this case it is preferred that the points of the V-shaped openings should be directed inwardly.

Instead of forming lips or notches of V-shape, these may be of arcuate form.

In some circumstances the valves or valvular openings may be produced in and by the stitching operation in the formation of the tube or conduit. In such form the valve elements are constituted by the margins or edges of the tube between the stitches or stitched parts.

In Figures 44, 45 and 46, examples are shown of a conduit $b$ of flat tubular form made by stitching (on the lines $j$) two elongated rectangular strips of grease-proof fabric together. This stitching preferably extends around the ends of the strips to close the tube but in some circumstances it may be desired to leave the end of the tube remote from the charging valve (the position of which is indicated by the dotted circle $c$) open.

Three types of conduit discharging or delivery valve in the grease-proof fabric are shown in these figures and indicated by the reference $k$. In Figure 44 the valves $k$ are formed by cutting out triangular pieces of the grease-proof fabric adjacent the edges. In Figure 45 the tube is slit or cut in open V-shape but no part of the material is removed so that the tongue $k'$ formed by the cutting operation constitutes a valve member. In Figure 45 the valves are formed by cutting elongated holes or slots $k$ which may be arranged in a single (or plurality of) series.

According to a modification a conduit may be embodied or combined with a wick material or other form of capillary or absorbent element or elements. For example, two wick elements $d^7$ and $b^8$ (Figure 48) are laid edge to edge (the edges being indicated by the dotted lines $m^2$) and on each side of the wick material the adjacent margins are bridged by strips of grease-proof fabric $b^5$ and $b^6$, the edges of these strips being stitched together through the margins of the wick. The discharge valves $k$ for the conduit are formed in the grease-proof strip $b^5$.

According to another form of the invention the tube or conduit may be comprised partly by grease-proof fabric and partly by a wick element. For example, a piece of wick material $d^9$ (see Figure 50) has stitched, as at $j$, to one side a strip $b^6$ of grease-proof fabric. The strip and the wick material may be practically coextensive as regards longitudinal arrangement in the gaiter and the conduit may be arranged more or less centrally of the wick material, which extends over the top and down the sides of the spring.

In the case where the wick material is adapted to lie against the spring and the grease-proof fabric $b^6$ of the conduit to lie next the jacket, valvular openings, such as $k$ or $k^2$, are formed or cut in the wick material itself. The valvular openings shown in Figure 50 are by way of example and the orifices may be formed by V-shaped or inclined slits which may, if necessary, be button-hole stitched.

When a conduit $b$ is composed of grease-proof fabric $b^5$ on one side and wick or other material $d^9$ on the other (see Figures 50 to 53) as described in the preceding paragraph, valves or openings may be formed in the grease-proof fabric as at $k$ (Figure 52) and in this case it is preferred that the material $b^5$ should be nearer the spring than the wick $d^9$.

It will be understood that where the discharge valves for the conduit are in the form of plain orifices, such are adapted to cooperate in their action with another surface, such as, for example, that provided by the surface or leaves of the spring or by the contact with another piece or strip of grease-proof fabric or with the under surface of the gaiter itself. It will be gathered that the pumping of the lubricant into the conduit causes it to swell up or bulge, so that the orifices or valve members are bent away from the surface against which they normally lie so as to open a path for the lubricant. Thus the operation or full opening of the valves is dependent upon the distortion of the conduits by the injection of the lubricant, the collapse of the conduit under the pressure of the gaiter when the lubricant ceases to be pumped into the conduit serving to close the valves or more or less seal the openings.

In carrying the invention into effect according to another mode (see Figures 54 and 55), the gaiter $z$ is provided with a lining $a$ which extends from one edge $n$ to the other edge $n'$ of the gaiter or outer leather jacket. The lining may terminate adjacent the line $n'$ or may be provided with an extension $a^3$ which lies beyond the edge $n'$ with a view to providing an additional flap which may be folded in when applying the gaiter to a spring so that the lining forms a complete tubular protection from the lubricant. In this way the leather or material of which the gaiter is formed is prevented from becoming sodden or sealed with the lubricant.

The lining $a$ is also adapted to serve as one side of the conduit for the lubricant, the other side being constituted by a strip of grease-proof fabric or material $b^5$. In this form a wick material may be incorporated or combined with the conduit on the same principle as already described in connection with Figures 48 and 49. The two strips of wick material $d^7$, $d^8$, are laid together so that their edges will lie within the conduit. The strip of material $b^5$ is then sewn over the adjacent wick margins to the lining $a$. The discharge valves for the conduit are formed by providing suitably shaped holes or orifices $k$ within the strip $b^5$. The lining $a$ may have flaps at the top and bottom of the gaiter which are folded over and stitched down upon the wicking as shown at $a^2$ in Figure 54.

It is preferred where a wick material is employed that this should extend along the sides of the spring when the gaiter is in position and in order to save material in cutting the wick material where it is desired to fit such to the tapered shape of the gaiter, a rectangular strip of wick material may be cut on the slant or on an incline. One of the pieces is then reversed, so that on bringing the two severed edges together the outer margins of the wick material are tapered somewhat corresponding to the taper of the jacket.

According to another modification, instead of providing a flexible tube or conduit corresponding more or less with the width of the spring, the conduit may be sufficiently wide to overlap or cover the sides of the spring in addition to the top thereof, the valve elements being provided in the centre and/or on each side so as to discharge the lubricant against or towards the edges of the spring leaves. By this method the capacity of the tube is considerably increased and the conveyance of lubricant to the spring leaf edges would be more rapid and direct. In this form the conduit may comprise a wick or absorbent material, or such may be made entirely of grease-proof fabric. When constructing a tube of the extent above indicated, the tube should be, when in the flattened state, of taper form to conform to the shape of the gaiter. The ends of the gaiter or jacket may have strips of felt or a piped strip may be sewn to the short edges of the outer cover to seal the interior of the gaiter and prevent the escape of the lubricant.

The action of the device as described above is as follows:—When the lubricant is forced into the filling valve c which is mounted in the gaiter or cover z, it immediately enters the conduit through the valve opening p (see Figure 47). The injection of the lubricant is accomplished by means of a grease or oil gun and the pressure of the entering fluid will cause the conduit to distend or swell up from one end to the other. This distortion under pressure of the lubricant causes the valves to open or the valvular orifices to be uncovered. The lubricant as it escapes from the valvular openings passes between the gaiter and the spring or between the wick material (where such is employed) and the spring or, where a lining is employed for the gaiter without wick material, between the lining and the spring.

It will be appreciated that the swelling or expansion of the conduit under the forced lubrication takes place against the resistance or resiliency of the casing or jacket which is tightly applied to the spring and it will be understood that as soon as the entrance of the lubricant under pressure ceases, the jacket or casing will react to compress or collapse the conduit, thus forcing all or most of the lubricant out of the conduit and into the gaiter next to the spring.

The dissemination of lubricant throughout the gaiter takes place through the clearances within such in contradistinction to the capillary or seepage method through a wick or absorbent material, although, of course, where a wick is employed, the capillary dispersal of lubricant will also be carried on.

The provision of a conduit for conveying the lubricant and dispersing it enables a graphited oil to be employed with the result that the wick becomes loaded with a proportion of graphite sediment, the presence of which not only assists the lubrication of the springs in conjunction with the oil in ordinary use but, should the gaiter be left unsupplied or not recharged with fresh lubricant for long periods, the graphite which has collected will act as a reserve lubricant and will (particularly as it dries) work in between the leaves of the springs and carry on the process of lubrication with the presence of little or no oil.

It is pointed out that the various forms of valve or openings illustrated and suggested in the description, are alternatives and interchangeable for the different forms of conduit or tube described and shown in the drawings and the type of valve or openings shown in connection with a particular conduit is not necessarily confined to that example.

Having now described my invention, what I claim as new and desire to secure by Letters Patent is:—

1. Means for lubricating vehicle and like springs comprising a flat tubular conduit of variable cross-sectional area formed of flexible material on each side through which lubricant can escape under pressure, and a non-return filling valve through which lubricant may be forced to cause the flat tubular conduit to distend, the arrangement being such that under working conditions the distended conduit collapses as the lubricant escapes.

2. Means for lubricating vehicle and like springs enclosed in a gaiter comprising a normally flat tubular conduit separate from the gaiter and adapted to lie between the latter and the spring surface, having an enclosing wall of flexible material in communication with a non-return filling valve and having valvular openings for the escape of lubricant, the arrangement and nature of the conduit being such that when lubricant is forced into it through the valve it is distended while under working conditions the lubricant escapes and the material of the conduit collapses as the latter is emptied.

3. Means for lubricating vehicle and like springs as claimed in claim 1 wherein the flat tubular conduit is formed of woven wick fabric through the walls of which the lubricant is adapted to escape.

4. Means for lubricating vehicle and like springs as claimed in claim 1 wherein a longitudinal flat tubular conduit has connected to it a plurality of lateral branch conduits also of flat tubular formation made of flexible material adapted to be distended and collapsed so that the main conduit and the branch conduits constitute a tubular system for the storage and distribution of the lubricant.

5. Means for lubricating vehicle and like springs comprising a spring cover within which a flexible flat tubular conduit is provided made of foldable material capable of expanding when lubricant is introduced and through the walls of which owing to internal pressure lubricant can escape, and a non-return filling valve through which lubricant can be forced to cause the conduit to distend, the arrangement being such that under working conditions the distended conduit collapses as the lubricant escapes.

6. Means for lubricating vehicle and like springs comprising in combination a spring cover, a separate lubricant-distributing unit within the cover comprising a flat tubular conduit made of foldable material capable of expanding when lubricant is introduced and through the walls of which owing to internal pressure lubricant can escape, and having an orifice for a filling valve, and a non-return filling valve mounted on the conduit and extending through the cover and through which lubricant can be forced to cause the conduit to distend, the arrangement being such that under working conditions the distended conduit collapses as the lubricant escapes.

7. Means for lubricating vehicle and like springs comprising a longitudinal flat tubular conduit of variable cross-sectional area formed of flexible material on each side, through which lubricant can escape under pressure, and a non-return filling valve through which lubricant may be forced to cause the flat tubular conduit to distend and collapse as the lubricant escapes, said conduit having connected to it a plurality of lateral branch conduits also of flat tubular formation made of flexible material adapted to be distended and collapsed so that the main conduit and the branch conduits constitute a tubular system for the storage and distribution of the lubricant, the branch tubular conduit extending from one longitudinal main conduit and being connected up with another longitudinal main conduit for the purposes described.

In testimony whereof I have signed my name to this specification.

HENRY RAMSDEN.